United States Patent [19]

Haller et al.

[11] Patent Number: 5,221,563
[45] Date of Patent: Jun. 22, 1993

[54] PROCESS FOR THE PREPARATION OF FIBER-REINFORCED CERAMIC MATRIX COMPOSITES

[75] Inventors: Wolfgang Haller, Chevy Chase, Md.; Uday V. Deshmukh, Concord, Calif.

[73] Assignee: The United States of America as represented by the Secretary of Commerce, Washington, D.C.

[21] Appl. No.: 984,677

[22] Filed: Dec. 2, 1992

Related U.S. Application Data

[60] Division of Ser. No. 673,246, Mar. 20, 1991, Pat. No. 5,187,008, which is a continuation of Ser. No. 307,109, Feb. 7, 1989, abandoned.

[51] Int. Cl.⁵ ............................................. B05D 3/06
[52] U.S. Cl. .................................... 427/558; 427/226; 427/370; 427/379; 427/434.2; 427/434.6; 427/443.2; 427/595
[58] Field of Search ............... 427/558, 226, 370, 379, 427/434.2, 434.6, 443.2, 595

Primary Examiner—Bernard Pianalto
Attorney, Agent, or Firm—B. Aaron Schulman

[57] ABSTRACT

A process for the production of fiber-reinforced ceramic matrix composites is disclosed. The process consists of making a slurry of the ceramic matrix composite material in an ultraviolet curing resin, and coating the fiber with the slurry in a continuous process whereby a continuous coating of ceramic matrix material is applied to the fiber. The coated fiber is then employed to reinforce ceramic matrix composites. The continuous coating of ceramic matrix material on the surface of the fibers provide improved properties in the composite.

5 Claims, 1 Drawing Sheet

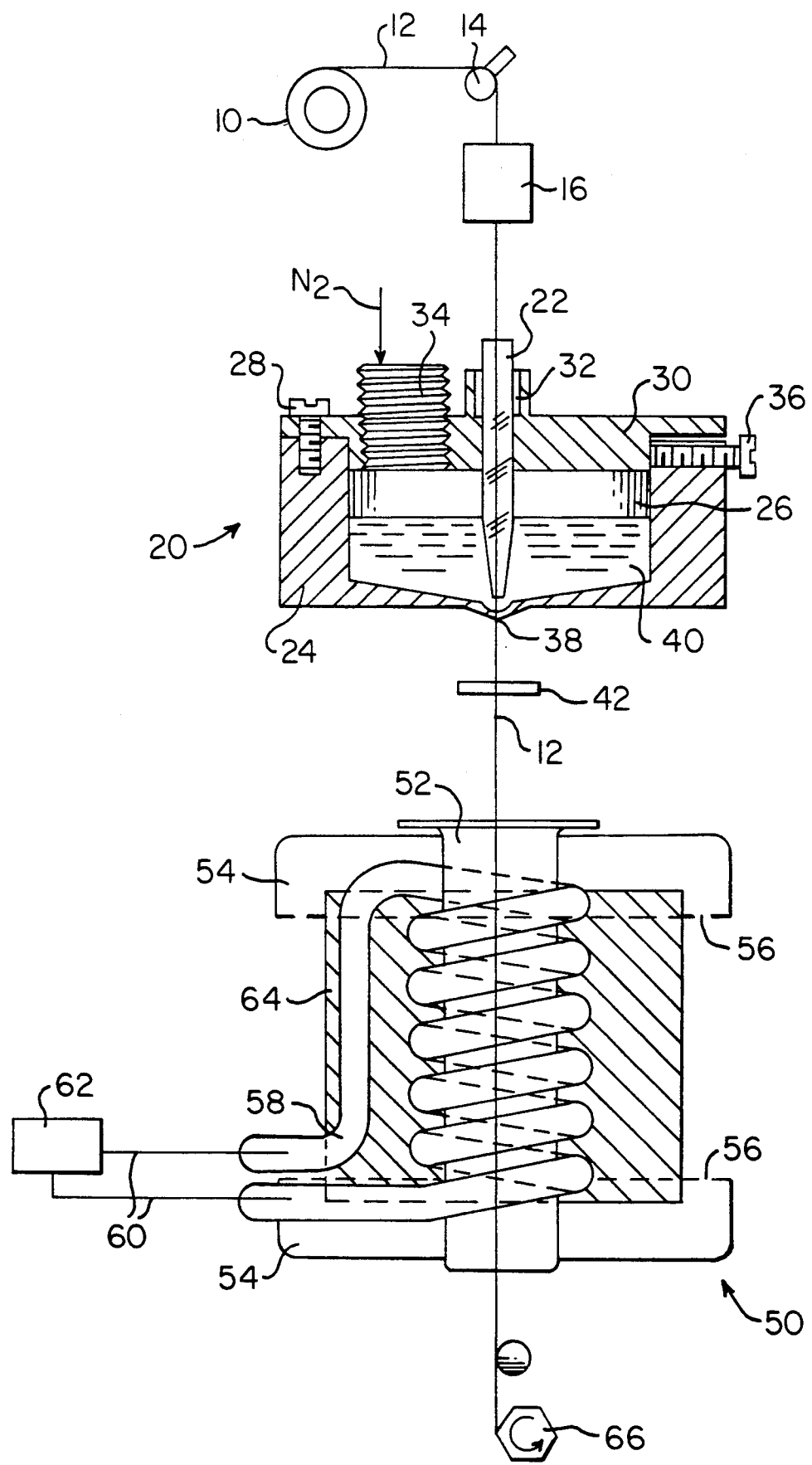

PROCESS FOR THE PREPARATION OF FIBER-REINFORCED CERAMIC MATRIX COMPOSITES

This application is a division of application Ser. No. 07/673,246, filed Mar. 20, 1991 U.S. Pat. No. 5,187,008, which is a continuation of application Ser. No. 07/307,109, filed Feb. 7, 1989, now abandoned.

FIELD OF THE INVENTION

The present invention relates to a process for the production of fiber-reinforced ceramic matrix composites.

BACKGROUND OF THE INVENTION

A critical step in the fabrication of fiber-reinforced composites is the controlled, uniform positioning of the fiber in the ceramic matrix. These composites are frequently fabricated by infiltrating the fully or partially assembled fibers with molten ceramic matrix material or a suspension of the ceramic matrix material. Such a suspension may be a sol-precursor of the matrix, or a slurry of the matrix powder and a binder solution.

The aforementioned slurry infiltration techniques generally must be carried out by hand and are extremely tedious. In addition, these slurry infiltration techniques impose limits on the size and uniformity of the composite. For example, the uniformity of the composite is often disturbed by a well-known filtration phenomenon which causes the particles of matrix material to be strained from the suspension when they are infiltrating the porous compact.

In order to solve these problems, it has been proposed in "Carbon Fiber Composites With Ceramic and Glass Matrices," Sambell, R.A.J. et al. J. Mater S.C.I. 7, page 767 (1972) to coat fibrous materials with a suspension of matrix particles in a binder solution. In this process, carbon fiber yarn was taken from its spool and, after a heat cleaning step to burn off the sizing, the fiber yarn was drawn through a coating tank containing a suspension of matrix particles in a binder solution, through a drying zone and finally wound around a mandrel. This coating technique works well for fiber yarn but not for monofilaments. The yarn, consisting of a multiplicity of fibers and capillary spaces, provides a wicking action which accepts and retains the coating slurry in the yarn. If this process is applied to smooth monofilament fibers, the coating breaks up into small droplets because of the surface tension of the coating liquid.

In a non-analogous art, it is known to apply ultraviolet curable protective coatings to glass fibers used in fiber optical applications to provide enhanced strength to the fibers. For example, U.S. Pat. No. 4,741,958 issued on May 3, 1988 discloses a buffer-coated and over-coated optical glass fiber in which the top coat has high strength and a high tensile modulus combined with good elongation and solvent resistance. The top coat is applied by ordinary coating procedures and cured by exposure to ultraviolet radiation.

U.S. Pat. No. 4,585,534 issued on Apr. 29, 1986 discloses the application of an ultraviolet-initiated cationically curable liquid coating composition to an optical fiber as a protective coating. The coating is of low modulus.

U.S. Pat. No. 4,662,307 issued on May 5, 1987 discloses a method and apparatus for recoating optical waveguide fibers with an ultraviolet-curable resin. The method involves positioning the fiber in a mold, introducing ultraviolet-curable resin into the mold and introducing ultraviolet light into the mold to cure the resin.

U.S. Pat. No. 4,636,405 issued on Jan. 13, 1987 discloses a curing apparatus for a coated optical fiber. The curing apparatus includes an elongated ultraviolet lamp and an elliptical mirror which focuses the ultraviolet energy onto the coated fiber. The fiber is surrounded by a cylindrical chamber which is transparent to ultraviolet light and includes a jacket for conveying fluid which absorbs infrared energy. A cooling gas flows into the chamber to cool the coated fiber.

Finally, U.S. Pat. No. 4,407,847 issued on Oct. 4, 1983 discloses a process for the manufacture of glass sheets. The process includes the steps of selecting a glass sheet and applying an opaque band to a surface of the sheet. The opaque band is formed from a radiation curable paste which includes a filler material which fuses to the glass sheet when heated to its fusion temperature, and a radiation curable material which is heat decomposable into components which are non-reactive with the glass sheet. After the paste is applied, the radiation curable material is cured to form a temporary bond between the paste and the surface of the glass sheet and heating is continued to fuse the filler material to the glass sheet and at the same time, decompose the radiation curable material into components which are non-reactive with the glass sheet.

Accordingly, there is a need in the art of fiber/matrix composites for a method for coating fibers with a continuous coating of ceramic matrix material in order to facilitate the subsequent fabrication and improve the properties of fiber-reinforced ceramic matrix composites.

Accordingly, it is the primary object of the present invention to provide a process for applying a continuous coating of ceramic matrix material on the surface of a fiber.

It is a still further object of the present invention to provide a process for the preparation of fiber-reinforced ceramic matrix composites which provides more uniform composite materials.

It is a still further object of the present invention to provide a process for the preparation of fiber-reinforced ceramic matrix composites which can be carried out in a continuous manner on an automated apparatus.

It is a still further object of the present invention to provide a method for the preparation of fiber-reinforced ceramic matrix composites which does not impose size limitations on the composites.

These and other objects of the present invention will be apparent to one of ordinary skill in the art from the summary and detailed description which follow.

SUMMARY OF THE INVENTION

In one aspect, the present invention relates to a process for coating a fiber with a continuous coating of a ceramic matrix material. The first step of the process involves preparing a slurry of a sufficient amount of at least one ceramic matrix material to form a continuous coating on a fiber and a sufficient amount of at least one ultraviolet curing agent to bind the continuous coating of ceramic matrix material to the fiber upon curing. A fiber is then drawn through the slurry to apply a continuous coating of slurry on the surface of the fiber and the coating is rapidly cured before breakup of the coating slurry on the surface of the fiber can occur. Finally, the coated fiber is heat treated to decompose substantially all of the ultraviolet curing agent in the coating.

In a second aspect, the present invention relates to a process for the preparation of fiber-reinforced ceramic matrix composites. In the first step of this process a fiber is coated with a slurry of a sufficient amount of at least one ceramic matrix material to form a continuous coating on the surface of the fiber and a sufficient amount of an ultraviolet curing agent to bind the continuous coating of ceramic matrix material to the fiber upon curing. Then, the coating is rapidly cured before breakup of the coating slurry on the surface of the fiber can occur. The coated monofilament is next subjected to heat treatment to decompose substantially all of the ultraviolet curing agent in the coating. Finally, the ceramic matrix composite is fabricated by densifying the coated fiber compact at sufficient temperature and pressure.

BRIEF DESCRIPTION OF THE DRAWING

The single figure is an elevation of a schematic representation of an apparatus for coating fibers in accordance with the present invention and having the coater and ultraviolet lamp shown in cross section.

DETAILED DESCRIPTION OF THE PREFERRED EMBODIMENTS

Referring to the single figure, there is shown an apparatus for applying a continuous coating of ceramic matrix material to the surface of a fiber. The apparatus includes a fiber spool 10 which serves as the source of the fiber which is fed to the apparatus. Fiber 12 is drawn off fiber spool 10 and first fed to tension device 14 which maintains the required tension on fiber 12 throughout the coating apparatus. Fiber 12 then proceeds to a heat cleaner 16 to ensure that fiber 12 does not have dirt or impurities on its surface which may interfere with the application of a continuous coating.

From heat cleaner 16, fiber 12 proceeds to coater 20. Coater 20 includes a housing 24 which defines a chamber 26 therein. Attached to housing 24 by lid screw 28 is a lid 30. Lid 30 includes a central aperture in which fiber guide 22 is mounted by cement 32. Lid 30 also includes a gas inlet 34 which may be used for pressurizing chamber 26 of coater 20 with an inert gas. Additionally, lid 30 is positionable by alignment screw 36 to prevent fiber 12 from contacting the walls of fiber guide 22 and draw hole 38 in housing 24 through which fiber 12 passes as it leaves coater 20. Inside chamber 26 there is shown a volume of coating slurry 40 which is used to coat fiber 12.

From coater 20, fiber 12 passes through light shield 42 which prevents impingement of ultraviolet light from ultraviolet lamp 50 upon the draw hole 38 of coater 20. After passing through light shield 42, fiber 12 is exposed to ultraviolet radiation from ultraviolet lamp 50 before and as it enters lamp tube 52. Ultraviolet lamp 50 includes reflectors 54 surrounding lamp tube 52 to contain as much stray ultraviolet radiation in the vicinity of lamp tube 54 as is possible. Reflectors 54 each have ventilation gaps 56. A helical ultraviolet lamp 58 surrounds lamp tube 52 and is connected to electrodes 60 which are energized by power source 62. Ultraviolet curing apparatus 50 is contained in housing 64 which is preferably fabricated from aluminum since aluminum can also mm used to fabricate reflectors 54. Finally, fiber 12 passes to drum winder 66 which winds the coated fiber for further use.

In operation, drum winder 66 pulls fiber 12 from fiber spool 10, through tension device 14, heat cleaner 16, coater 20 and finally through ultraviolet curing device 50. Heat cleaner 16 is preferably a clam shell tube furnace such as those conventionally known for cleaning fibers, including monofilaments.

Coater 20 includes housing 24 which is preferably a brass container having a draw hole 38 in the bottom thereof. Fiber guide 22 is preferably a heavy-wall glass capillary having a hole at it lower tip which is slightly larger than the diameter of fiber 12. Such a glass capillary can be easily fabricated by drawing down the capillary in a flame, followed by probing it with fiber 12. The drawn-down end of fiber guide 22 is slightly conical and therefore, during fabrication of fiber guide 22, fiber 12 will come to a stop when the diameters of fiber 12 and the hole in lower tip of fiber guide 22 are equal. At this point, fiber guide 22 is cut a short distance above the point at which the diameters are equal to produce a fiber guide 22 having a hole at its lower tip which is slightly larger than the diameter of fiber 12.

Housing 24 of coater 20 includes a draw hole 38 located at the tip of a protruding nipple 27 in the bottom of chamber 20. Draw hole 38 is preferably of about 1.2 millimeters in diameter, although other diameters may be used depending upon the diameter of fiber 12. Fiber guide 22 is positioned approximately 2 millimeters above draw hole 38 and a thermoplastic cement 32 is employed to position fiber guide 22 in the aperture in the center of lid 30. Lid 30 includes at least one lid screw 28 and may include as many as three lid screws 28 to hold it in position. In addition, lid 30 includes at least one alignment screw 36 which is employed to align fiber guide 22 concentrically with draw hole 38. As many as three alignment screws 36 may be employed to achieve proper alignment. A threaded gas inlet 34 in lid 30 is employed for filling chamber 26 with coating slurry 40 as well as connection of a hose (not shown) used to pressurize coater 20 with an inert gas, such as nitrogen from an inert gas source.

Pressurizing of chamber 26 is particularly advantageous since it makes the resultant coating thickness largely independent of the head of coating slurry 40 in coater 20 and assures that enough coating slurry 40 is delivered to draw hole 38 to provide an acceptable coating even at high fiber drawing speeds. Further, pressurizing of chamber 26 can be used to vary the coating thickness of the ceramic matrix material on fiber 12 without changing the diameter of draw hole 38. This effect results from the fact that the supply of coating slurry 40 to draw hole 38 is directly proportional to the amount of pressure applied to chamber 26. Accordingly, application of additional pressure provides more coating slurry 40 to draw hole 38 per unit time and thus, increases the resultant coating thickness. Pressures employed in chamber 26 may be, for example, from about 1 to about 2 psi to produce fibers with coatings of intermediate thickness.

The linear drawing speed of fiber 12 also affects the monofilament coating. The most preferred linear drawing speed was approximately 15 centimeters/second. At this speed, fiber 12 emerges from ultraviolet curing device 50 with a solidified but slightly tacky surface. The fiber coating was smooth and uniform at this particular drawing speed as well. This drawing speed was found to be optimal when employing the particular light level described herein. The optimum drawing speed will depend upon the distance between draw hole 38 and ultraviolet curing device 50 since it is necessary to cure the ultraviolet curing agent before the coating breaks up on the surface of fiber 12. The optimum drawing speed will also depend on the chamber pressure, coating material, fiber material, light level and desired coating thickness.

Ultraviolet curing device 50 may be any suitable ultraviolet curing device known to those of ordinary skill in the art. A particular device is illustrated in the figure for the purposes of describing the present invention. This particular device includes ventilation gaps 56 to allow air circulation within ultraviolet curing device 50 while preventing the loss of ultraviolet light.

The optimum ultraviolet curing device 50 will emit ultraviolet light at the wave length of maximum cure rate in the ultraviolet curing agent chosen for the particular coating application. For example, when a solventless polyacrylate resin with a photo-initiated catalyst system was chosen, the optimum wavelength was 350 nanometers. Suitable lamps are preferably gas discharge lamps, such as commercial mercury lamps or iron iodide vapor lamps. Ultraviolet curing device 50 is shown with a mercury lamp 58 and includes lamp tube 52 fabricated from lead doped barium silicate phosphor which converts the ultraviolet light of 257 nanometers in wavelength emitted by the mercury lamp 58 into light of approximately 350 nanometer wavelength for optimum curing. The power supply of mercury lamp 58 is a high voltage transformer such as those commercially available and typically used with gas discharge lamps. The transformer includes an internal current limiter and operates at a maximum voltage of 15,000 volts and a maximum current of 30 ma. Following ignition, the mercury discharge lamp operates at 500 volts and 30 ma.

If an iron iodide vapor lamp is employed, ultraviolet curing device 50 must be slightly modified since iron iodide vapor lamps are usually not energized by electrodes as are mercury discharge lamps. Iron iodide vapor lamps will generally be energized by microwaves and are less preferable for the coating application since they are rather expensive, although they have the advantage of generating light at higher wavelengths than mercury lamps.

Fibers 12 may be any suitable material used to reinforce ceramic matrix composites. For example, fibers such as silicon carbide may be employed. Other fibrous materials such as graphite, alumina, or metals are also useful. The fibers may be used in any suitable diameter depending upon the desired volume fractions of filament in the resulting reinforced composite.

The coating technique of the invention is particularly useful for coating monofilaments because other monofilament coating methods are unsatisfactory. The process of the invention overcomes the problem of Rayleigh breakup of the coating on the surface of a monofilament and thus provides a useful method for applying a continuous coating to a monofilament surface.

The ceramic matrix material is preferably a glass matrix material, such as borosilicate glass, or polycrystalline ceramic such as alumina. Other known ceramic matrix materials such as may also be used in the present process. The ceramic matrix material is typically supplied in powder form and mixed with the ultraviolet curing agent to form a coating slurry 40. Typically, the volume ratio of ceramic matrix material to ultraviolet curing agent in coating slurry 40 will be from about 5:95 to about 60:40, and more preferably from about 10:90 to about 30:90. Most preferably, the weight ratio of ceramic matrix material to ultraviolet curing agent is about 20:80.

Suitable ultraviolet curing agents include any of the known ultraviolet curing agents which ar heat decomposable and will not adversely affect the final properties of the ceramic composite. Ultraviolet curing agents such as a solventless polyacrylate resin with a photo-initiated catalyst system, may be employed. When selecting an ultraviolet curing agent, the viscosity and curing rate should be taken into consideration since both of these properties will affect the time required for Rayleigh breakup of coating slurry 40 on the surface of fiber 12.

In the manner described above, a method for coating fibers including monofilaments with a continuous layer of ceramic matrix material has bee disclosed. This method eliminates the problem of Rayleigh breakup of the slurry on the filament surface which generally occurs immediately after coating. In this way, uniformly and continuously coated fibers including monofilaments can be prepared and subsequently heat treated to remove the ultraviolet curing agent and leave a fiber coated only with ceramic matrix material. It has been found that such coated fibers provide improved properties in ceramic matrix composites, since the ceramic matrix material coating on the surface of the fibers minimize problems encountered with slurry infiltration techniques, and also removes size limitations on the composites which can be fabricated.

To fabricate a fiber-reinforced ceramic matrix composite, the aligned and bundled fibers produced by the process of the present invention are fired in air through an ascending temperature program following by a sintering and compacting schedule in a suitable protective atmosphere. In this method of forming the compact, the heat treatment and sintering steps are combined. Thus, the heating first oxidizes and burns out the ultraviolet curing agent and then sinters the ceramic matrix material to form a ceramic/fiber compact.

The following example is provided to illustrate the process of the present invention.

EXAMPLE

A silicon carbide monofilament having a diameter of 140 micrometers and including a 33 micrometer graphite core and a 6 micrometer graphite coating was employed for this example. The ceramic matrix material consisted of a borosilicate glass in powdered form having a particle size of −325 mesh. A solventless polyacrylate resin with a photo-initiated catalyst system was chosen as the ultraviolet curing agent. This particular ultraviolet curing agent has a viscosity of 5,000 mPa's in the uncured state.

A glass powder/resin slurry having a weight ratio of 40:60 was prepared by mixing the constituents with a mortar and pestle. The mixture was transferred to a tall, foaming glass beaker and deaerated by repeated applications of vacuum in a desiccator. Subsequently, the resultant slurry was allowed to stand for one week in order to allow substantially all of the air bubbles to rise t the surface.

The coater was filled with the slurry and clamped above the curing device as shown in the single figure. The distance from the bottom of the coater to the top of the curing device was 10 centimeters. A small disk of aluminum foil with a center hole of 5 millimeters in diameter was placed between the ultraviolet curing device and the coater and served as a light shield to reduce light exposure of the drawing hole of the coater. The coater was pressurized to about 1 to 2 psi with nitrogen gas in order to drive the slurry through the draw hole. A linear drawing speed of 15 centimeters/-second was employed. At this speed, the monofilament emerged from the ultraviolet curing device with a solidified but slightly tacky surface. The fibers stuck slightly to each other but could be easily separated for further use in the composite assembly process. The monofilament coating was smooth and uniform at this drawing speed and light level and the coated monofilament diameter was 658±68 micrometers.

The coating procedure is best used with a drum winder having a reciprocating fiber guide such as that shown in the single figure. However, for the purposes of this example, the coated monofilaments were cut into pieces and hand laid into an alumina boat and fired in air through an ascending temperature program which ended with a one hour treatment at 700° C. The heat treatment decomposed the ultraviolet curing agent and sintered the glass powder just enough to allow handling of the powder/monofilament compact.

Following the heat treatment, the compact was transferred to a molybdenum sheet lined carbon mold and was hot-pressed in a helium atmosphere at 700° C. and a pressure of 1,000 psi. After hot-pressing, the compact was square trimmed with a diamond saw.

An optical micrograph of a thin section of the composite showed that the monofilaments were fairly uniformly spaced although, as expected, the spacing in the hot-pressing direction is smaller than in the transverse direction. In this particular example, 1,113 monofilaments/cm$^2$ were employed. The monofilament volume fraction was 0.17 in this composite. In addition, the density of the composite was determined by the Archimedian method to be 2.342 g/cc. Based upon these observations, it appears that volume fractions of monofilament of up to 40 to 65% are easily attainable by decreasing the thickness of the ceramic matrix material coating applied to the monofilament by the coating process.

The foregoing description of embodiments of the invention has been presented for the purposes of illustration and description only and many modifications and variations will be apparent to one of ordinary skill in the art from the above teachings. Accordingly, the scope of the present invention is to be determined by the claims appended hereto.

What is claimed is:

1. A process for the preparation of a fiber-reinforced ceramic matrix composite comprised of monofilament fibers having a continuous uniform coating of a ceramic matrix material comprising the steps of:
    (a) coating at least one monofilament fiber by drawing the fiber through a filament guide immersed in a slurry comprised of a ceramic matrix material in an amount sufficient to form a continuous uniform coating on the surface of the fiber and an ultraviolet curing agent in an amount sufficient to bind the continuous uniform coating of ceramic matrix material to the fiber upon curing with ultraviolet radiation;
    (b) rapidly curing the coating before breakup of the coating slurry on the fiber by exposure to ultraviolet radiation;
    (c) heat treating at least one coated and cured monofilament fiber to decompose the ultraviolet curing agent and sinter the ceramic material to form a compact; and
    (d) densifying the compact to produce a fiber-reinforced ceramic matrix composite comprised of at least one monofilament fiber having a continuous uniform coating of a ceramic matrix material.

2. A process according to claim 1 wherein the linear drawing speed of the coating step is from about 12 cm/sec to about 18 cm/sec.

3. A process according to claim 1 wherein the ceramic matrix material is selected from the group consisting of glasses and polycrystalline ceramics.

4. A process according to claim 1 wherein the volume ratio of the ceramic matrix material to the ultraviolet curing agent in the slurry is from about 5:95 to about 60:40.

5. A process for the preparation of a fiber-reinforced ceramic matrix composite intermediate product comprised of monofilament fibers having a continuous uniform coating of a ceramic matrix material comprising the steps of:
    (a) coating at least one monofilament fiber by drawing the fiber through a filament guide immersed in a slurry comprised of a ceramic matrix material in an amount sufficient to form a continuous uniform coating on the surface of the fiber and an ultraviolet curing agent in an amount sufficient to bind the continuous uniform coating of ceramic matrix material to the fiber upon curing with ultraviolet radiation; and
    (b) rapidly curing the coating before breakup of the coating slurry on the fiber by exposure to ultraviolet radiation so as to form the composite intermediate product.

* * * * *